March 22, 1932. J. P. DALY 1,850,260

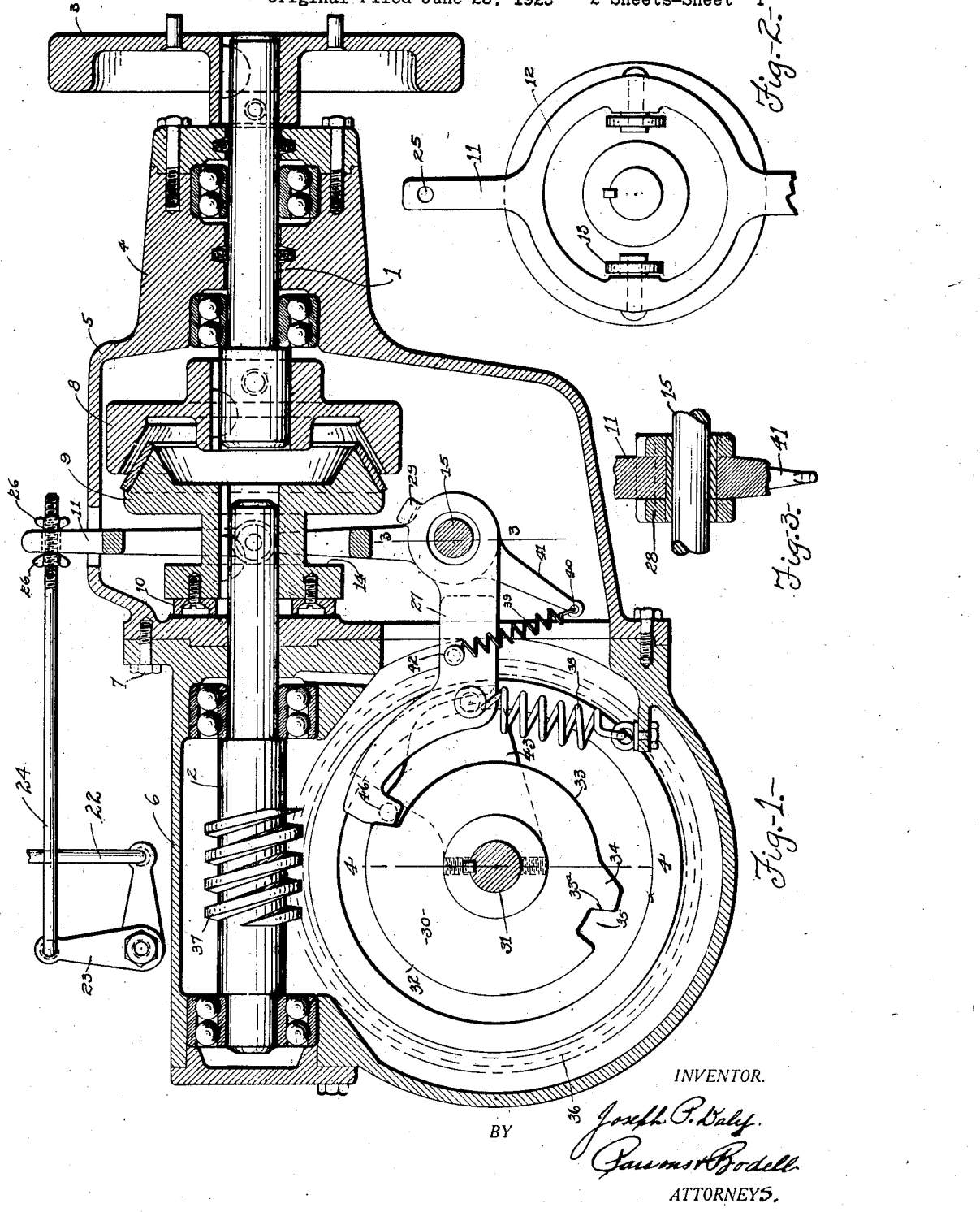

CLUTCH CONSTRUCTION FOR PRESSING MACHINES

Original Filed June 23, 1925  2 Sheets-Sheet 2

INVENTOR.
Joseph P. Daly
BY
ATTORNEYS

Patented Mar. 22, 1932

1,850,260

UNITED STATES PATENT OFFICE

JOSEPH P. DALY, OF SYRACUSE, NEW YORK, ASSIGNOR TO THE PROSPERITY COMPANY, INC., OF SYRACUSE, NEW YORK, A CORPORATION OF NEW YORK

CLUTCH CONSTRUCTION FOR PRESSING MACHINES

Application filed June 23, 1925, Serial No. 39,023. Renewed March 27, 1930.

This invention relates to a clutch mechanism particularly applicable to such machines as garment and laundry presses etc., in which a movable pressing element is actuated by power, and has for its object a particularly simple and efficient controlling means for the clutch, through which the power of a motor is transmitted to, and disconnected periodically from, the movable pressing element to open and close the press.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of a clutch embodying my invention.

Figure 2 is a detail view of the shifting lever and contiguous parts.

Figure 3 is a sectional view on line 3—3, Figure 1.

Figure 7:
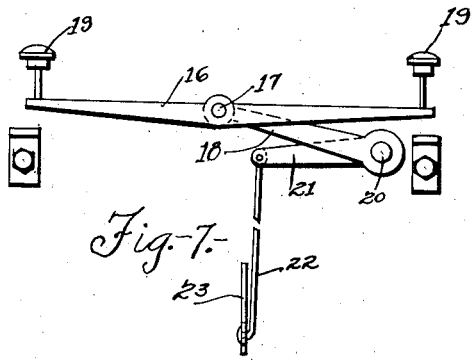
Figure 7 is a detail view of the dual or two handed control for throwing the clutch.
Figure 4:
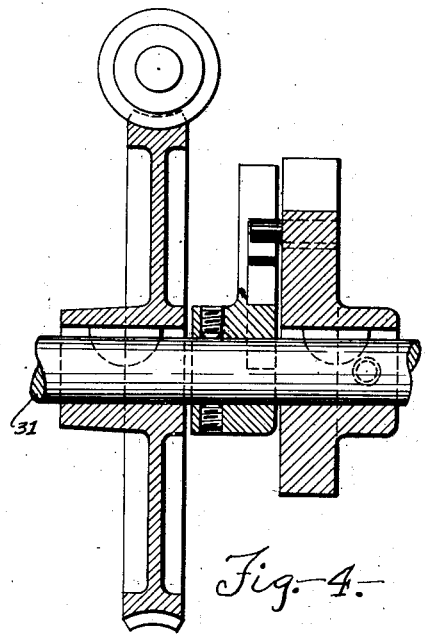
Figure 4 is a detail view, parts being omitted, on line 4—4, Figure 1.

This clutch mechanism comprises generally driving and driven elements or shafts, a clutch connecting said shafts and including a shiftable section normally out of clutching position, manual means for shifting the section into clutching position, and mechanism operated from the driven shaft for controlling the shifting of the clutch section out of clutching position.

1 designates the driving shaft, and 2 the driven shaft, these being arranged in axial alinement. The driving shaft is preferably the shaft of an electric motor and 3 designates the fly wheel of the motor. The shaft 1 is suitably journaled in a hub 4 of a housing 5. The driven shaft 2 is mounted in suitable bearings in a housing 6 which is detachably mounted on the housing 5 and secured thereto in any suitable manner as by screws 7, the driven shaft 2 extending into the housing 5.

8 is a clutch section mounted on the shaft 1 within the housing 5, and 9 is a shiftable clutch section mounted on the end of the shaft 2 within the housing 5, the clutch section 9 being shiftable axially of the projecting end of the shaft 2 and having a brake disk 10 coacting with the end wall of the housing 5 for stopping the rotation of the shaft 2 when the clutch section 9 is shifted to its off position.

The manual means for shifting the clutch section 9 into clutching position comprises a shifting lever 11 and suitable manual mechanism for operating it. This shifting lever 11 is here shown as bifurcated at 12 between its ends and as having rollers or other suitable means 13 carried by the bifurcated portion, which rollers work in an annular groove 14 in the hub of the clutch section 9. The lever 11 is pivoted or mounted at its lower end on a shaft 15 which is mounted in the housing 5.

The lever 11 is operated by dual manual or double handles both of which m'ist be operated in order to throw the lever 11. This double control is here illustrated as an equalizing or differential lever 16 pivoted between its ends at 17 to a motion transmitting lever 18, the lever 16 having handles 19 at its opposite ends. The motion transmitting lever 18 is mounted upon a fixed axis or shaft 20 having a rock arm 21 thereon which is operated by the lever 18 and is connected by means of a link 22 to one arm of the bell crank lever 23, the other arm of which is connected by the link 24 to the upper end of the lever 11. The link 24 extends through an eye 25 in the upper end of the lever 11 and has adjustable shoulders or units 26 on opposite sides of the lever. Obviously, if either one or the other of the handles 19 is depressed, the levers 16 will merely rock about the pivot 17 but if both handles 19 are depressed, the lever 16 will be depressed bodily thus actuating the motion transmitting lever 18 and hence the shifting lever 11, and if either one of the handles 19 is released before the press closes, the shifting lever 11 will move to its out position. Hence, both hands are required to hold the clutch engaged during the closing movement of the press.

The means operated from the driven shaft 2 for shifting the clutch section to out position comprises a follower lever 27 connected to the lever 11 and coacting with a cam which is driven from the shaft 2, the lever 27 being here shown as mounted upon the shaft 15 and as having hubs 28 on said shaft on opposite sides of the lever 11 and as having a yoke 29 connecting said hubs which thrusts against one side of the lever 11. This lever 27 coacts with a cam 30 mounted on a shaft 31 journaled in the housing 6 and extending crosswise of the shaft 2, the cam 30 having a high portion 32 on one side thereof concentric with its axis and a low portion 33 on the other side thereof concentric with its axis. The cam 30 is formed with stop shoulders 33ª between the high and low portions and also with a lobe 34 projecting from the low surface and spaced apart from one of said shoulders 33ª. The shaft 31 is connected to the shaft 2 through a worm gear 36 mounted on the shaft 31 and meshing with a worm 37 on the shaft 2. A spring 38 tends to hold the clutch section 9 in its out position, this spring being connected to the follower lever 27 to move it against the cam 30. Also there is a flexible spring or connection between the lever 11 and follower lever 27, this spring connection being designated 39 and being connected at one end at 40 to an arm 41 of the lever 11 below the shaft 15 and its other end at 42 to the lever 27.

When both handles 19 are depressed, the lever 11 is thrown to the right, Figure 1, carrying the clutch section 9 into engagement with the clutch section 8 so that the driven shaft 2 will be driven by the drive shaft 1 which is constantly running. Such movement of the lever 11 by the handles 19 causes the lever to press against the yoke 29 of the follower lever 27 and moves the follower lever upwardly out of engagement with the low point of the cam 30. As the shaft 2 and hence the shaft 31 is rotated, the nose of the follower lever 27 will ride on the high surface 32 of the cam until the notch 35 comes opposite the nose of the follower 27, whereupon the follower will drop into the notch 35 and in so doing the yoke 29 will press against the shifting lever 11 and carry the clutch section 9 out of clutching position and also carry the brake 10 into braking position. During this operation, the shaft 31 makes a half revolution. This half revolution corresponds to the opening of the press head of the pressing machine to be presently described.

When the levers 19 are again depressed, the nose of the lever 27 is moved out of the notch 35 as the clutch section 9 is thrown into clutching position, and during rotation of the cam 30 the nose of the lever 27 is opposite the low surface 33 of the cam so that if the operator releases either handle 19 the lever 27 will be moved by the spring 38 into engagement with the low surface 33 of the cam, thus throwing the clutch section 9 out of clutching position. Hence, the operator must keep both hands on the handles 19 while the surface 33 is opposite the nose of the follower lever 27. The low surface 33 is opposite the nose of the cam lever 27 during the closing movement of the press to be presently described.

Figure 5:
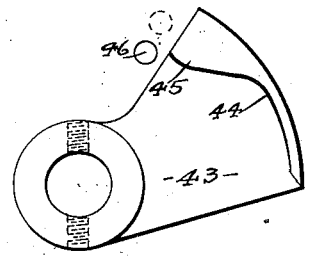
Figure 5 is a view of the cam for positively throwing the clutch to its out position at the end of the closing movement of the press.

Means is provided for positively moving the follower lever 27 into engagement with the low surface of the cam at the end of the cycle of movement so that the operator can not inadvertently or unintentionally hold both hands on the levers 19 too long to cause the shaft 31 to make more than a half revolution or to unintentionally cause the actuating mechanism to repeat. This means comprises a cam 43 mounted on the shaft 31 at one side of the cam 30 and having a cam face 44 (Fig. 5) provided with a lift portion 45, this cam face 44 and its lift portion 45 coacting with a pin or follower 46 projecting from one side of the nose of the lever 27. As the parts approach their position shown in Figure 1, the pin 46 rides under the cam face 44 and finally is carried by the lift portion 45 into engagement with the low surface 33 of the cam 30 thus causing the lever 27 to be rocked downwardly and to rock the lever 11 to the left and hence through the connections 24, 23, 22, 21 and 18 force the handles 19 upwardly so that the operator will know that the cycle of movement is completed. This takes place when the press head of the pressing machine to be described is closed, and prevents the cam from carrying the high surface 32 thereof under the nose of the lever 27 before the operator can let go of the handles 19.

This clutch mechanism is here shown as applied to a pressing machine for operating a movable element or press head 51 thereof, this press head being carried by a suitable yoke or lever 52 pivoted between its ends at 53 to a standard 54 rising from the main frame 55 of the machine. The head 51 is movable toward and from a buck 56 which is mounted on the frame 55. The yoke 52 is actuated in any suitable manner as by a power arm 57 pivoted at 58 to the frame and a toggle actuated by the power arm. This toggle may consist of a link 59 forming a bell crank lever with the power arm 57 and a link 60 pivoted at 61 to the link 59 and at 62 to the rear arm of the yoke 52. Suitable counterbalancing weights 62 and also counterbalancing springs may be connected to the yoke 52. The power arm 57 is actuated by a crank or eccentric or cam 64 mounted on a disk 65 which in turn is mounted upon one end of the shaft 31. The handles 19 are mounted on the front of the machine and the shaft 20 is suitably mounted on a bearing on the frame 55. The motor 66 is mounted upon bracket on the frame.

During the depression of both handles 19, the press will be moved to closed position and the parts of the clutch mechanism will assume the positions shown in Figure 1.

Figure 6:
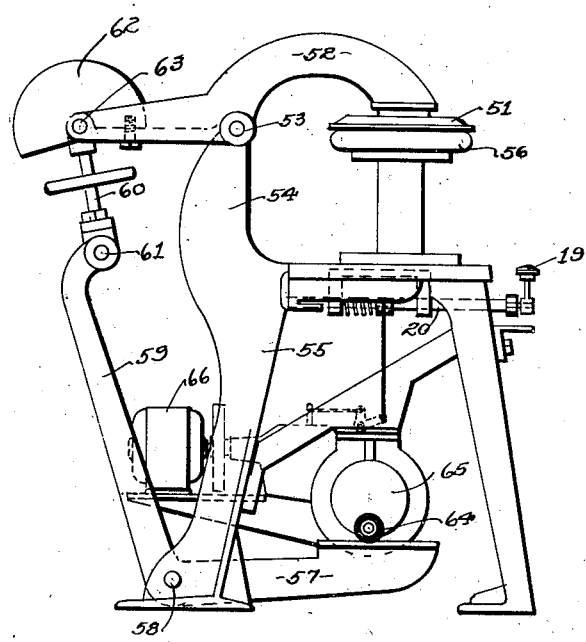
Figure 6 is a side elevation of a press embodying my invention.

To open the press, both handles 19 are depressed and the nose of the lever 27 rides on the high surface 32 of the cam 30 until the shaft 31 has made a half revolution carrying the cam or eccentric 64 to its position diametrically opposite that seen in Figure 6 so that the nose of the lever 27 is now in the notch 35. To close the press, both handles 19 are depressed and must be held depressed as the nose of the follower 27 is opposite the low surface 33 of the cam 30. When the half revolution is completed, that is, when the press is closed and the cam or eccentric 64 in its position shown in Figure 6, the machine is automatically stopped in closed position, even though the operator neglects to let go of the handles 19 at the proper instant, by reason of the fact that the cam 43 engages the pin 46 on the nose of the lever 27 and pulls it into engagement with the low surface of the cam 30 as the cam 30 approaches its position shown in Figure 1.

Owing to the construction and arrangement of this clutch, it is a unit with the power shaft and can be readily assembled therewith and detached therefrom.

What I claim is:

1. In a clutch mechanism, the combination of driving and driven shafts, a clutch connecting said shafts including a shiftable section normally out of clutching position, manual means for shifting the section into clutching position, mechanism operated from the driven shaft for controlling the shifting of the clutch section out of clutching position, such controlling mechanism being constructed to require the section to be held in clutching position during a predetermined cycle of movement, and means operated from the driven shaft for positively moving the clutch section out of clutching position at the end of such predetermined movement.

2. In a clutch mechanism, the combination of driving and driven shafts, a clutch connecting said shafts including a shiftable section normally out of clutching position, manual means for shifting the section into clutching position, mechanism operated from the driven shaft for controlling the shifting of the clutch section out of clutching position, such controlling mechanism comprising a cam having a low surface arranged to require the section to be held in clutching position during a predetermined cycle of movement of the cam, and means operated from the driven shaft to positively move the clutch out of clutching position.

3. In a clutch mechanism the combination of driving and driven shafts, arranged in axial alinement and a clutch connecting said shafts including a shiftable section normally out of clutching position, manual means including a shifter for moving the section into clutching position, a motion transmitting element and reduction gearing between the driven shaft and said element whereby the driven shaft makes a plurality of revolutions relatively to said motion transmitting element, and means operated by said element for shifting said clutch section out of clutching position.

4. In a clutch mechanism the combination of driving and driven shafts, arranged in axial alinement and a clutch connecting said shafts including a shiftable section normally out of clutching position, manual means including a shifter for moving the section into clutching position, a motion transmitting element and reduction gearing between the driven shaft and said element whereby the driven shaft makes a plurality of revolutions relatively to said motion transmitting element, means operated by said element for shifting said clutch section out of clutching position comprising a cam, a follower coacting with the cam and connected to the shifter to operate the shifter and be operated by the shifter out of engagement with the cam, and spring means normally acting to move the clutch section out of clutching position.

5. In a clutch mechanism the combination of driving and driven shafts, arranged in axial alinement and a clutch connecting said shafts including a shiftable section normally out of clutching position, manual means including a shifter for moving the section into clutching position, a motion transmitting element connected to the driven shaft through reduction gearing including a worm on the driven shaft, and a worm gear connected to said motion transmitting element, and means operated by said element for shifting the clutch section out of clutching position.

6. The combination of a housing, a driving shaft unit mounted on the shaft in the housing, a second housing detachably mounted on the first housing, a driven shaft mounted in the second housing and extending into the first housing, and a motion transmitting element in the second housing and coacting with the driven shaft, a clutch comprising sections carried in the first housing on the driving and the driven shafts respectively, one section being shiftable, manual means for shifting the shiftable section into clutching position, and automatic means for controlling the shifting of the clutch section out of clutching position, the said means being located within and carried by one of the housings.

7. In a pressing machine in combination, cooperating pressing elements, one of which is movable toward and from the other, actuating means for the movable pressing element, a motor for operating said actuating means, a clutch connecting said motor and said actuating means, manual control means for engaging the clutch, automatic means for disengaging the clutch when the pressing elements have come together.

8. In a pressing machine in combination, cooperating pressing elements, one of which is movable toward and from the other, actuating means for the movable pressing element, a motor for operating said actuating means, a clutch connecting said motor and said actuating means, manual control means for engaging the clutch, means to disengage the clutch if the manual control means is released during closing movement of the press, automatic means for disengaging the clutch when the pressing elements have come together and when the pressing elements are moved apart into open position.

9. In a pressing machine in combination, cooperating pressing elements, one of which is movable toward and from the other, actuating means for the movable pressing element, a motor for operating said actuating means, a clutch connecting said motor and said actuating means, manual control means for engaging the clutch, means to disengage the clutch if the manual control means is released during closing movement of the press, cam means driven from the actuating means for automatically disengaging said clutch when the pressing elements come together into closed position.

10. In a pressing machine in combination, cooperating pressing elements, one of which is movable toward and from the other, actuating means for the movable pressing element, a motor for operating said actuating means, a clutch connecting said motor and said actuating means, manual control means for engaging the clutch, means to disengage the clutch if the manual control means is released during closing movement of the press, means driven from the actuating means for automatically disengaging said clutch when the pressing elements have come together into closed position and for holding said clutch engaged when the actuating means are operated to move the pressing elements away from one another to open the press.

11. In a pressing machine clutch mechanism, the combination of a driving member, a driven member, a clutch connecting said members including a shiftable portion, means for shifting said portion to engage the clutch and other means to control the shifting of said portion to disengage the clutch, driving connections between said disengaging control means and one of said members, said disengaging control means including mechanism for automatically disengaging the clutch a plurality of times during the cycle of operation of the disengaging control means.

12. In a pressing machine clutch mechanism, the combination of a driving shaft, a driven shaft, a clutch connecting said shafts including a shiftable portion, manual control means for shifting said shiftable portion to engage the clutch, means for shifting the shiftable portion to disengage the clutch, said disengaging means including cam means, a driving connection between the driven shaft and the cam means for operating the cam means at a predetermined speed ratio with the driven shaft, throws on said cam means to cause the clutch to be disengaged a plurality of times during each revolution of the cam means.

In testimony whereof, I have hereunto signed my name, at Syracuse, in the county of Onondaga, and in the State of New York, this 1st day of June, 1925.

JOSEPH P. DALY.